United States Patent [19]

Skahill

[11] 4,077,655

[45] Mar. 7, 1978

[54] SHOCK MOUNT FOR PROTECTIVE STRUCTURE FOR TRACTORS

[75] Inventor: Richard John Skahill, Bettendorf, Iowa

[73] Assignee: J. I. Case Company, Racine, Wis.

[21] Appl. No.: 791,231

[22] Filed: Apr. 27, 1977

[51] Int. Cl.² .................. B60R 27/00; F16B 9/00
[52] U.S. Cl. ................................ 280/756; 403/224
[58] Field of Search ............ 280/756, 755; 296/102; 403/224, 227

[56] References Cited

U.S. PATENT DOCUMENTS

| | | | |
|---|---|---|---|
| 2,740,650 | 4/1956 | Hutton | 403/224 |
| 3,036,858 | 5/1962 | Fingerut | 280/756 |
| 3,560,019 | 2/1971 | Moore | 280/756 |
| 3,847,492 | 11/1974 | Kennicutt | 403/224 |
| 3,851,982 | 12/1974 | See | 280/755 |
| 3,873,222 | 3/1975 | Babbit | 280/755 |

*Primary Examiner*—Robert R. Song
*Attorney, Agent, or Firm*—Arthur J. Hansmann

[57] ABSTRACT

Shock mount for protective structure for tractors, including an upstanding post affixed to the tractor to protect the operator in the event that the tractor rolls over or in the event something falls on the tractor. A post mounting member is affixed with the tractor chassis, and an assembly of an elastomer insert and a bushing and a bolt interconnect the post and the chassis, and actually the elastomer insert and the bushing are presented in duplicate in the assembly. The inserts have a tapered interior opening, and the bushing is received within the opening to urge the insert outwardly into snug fit with the mounting member.

5 Claims, 6 Drawing Figures

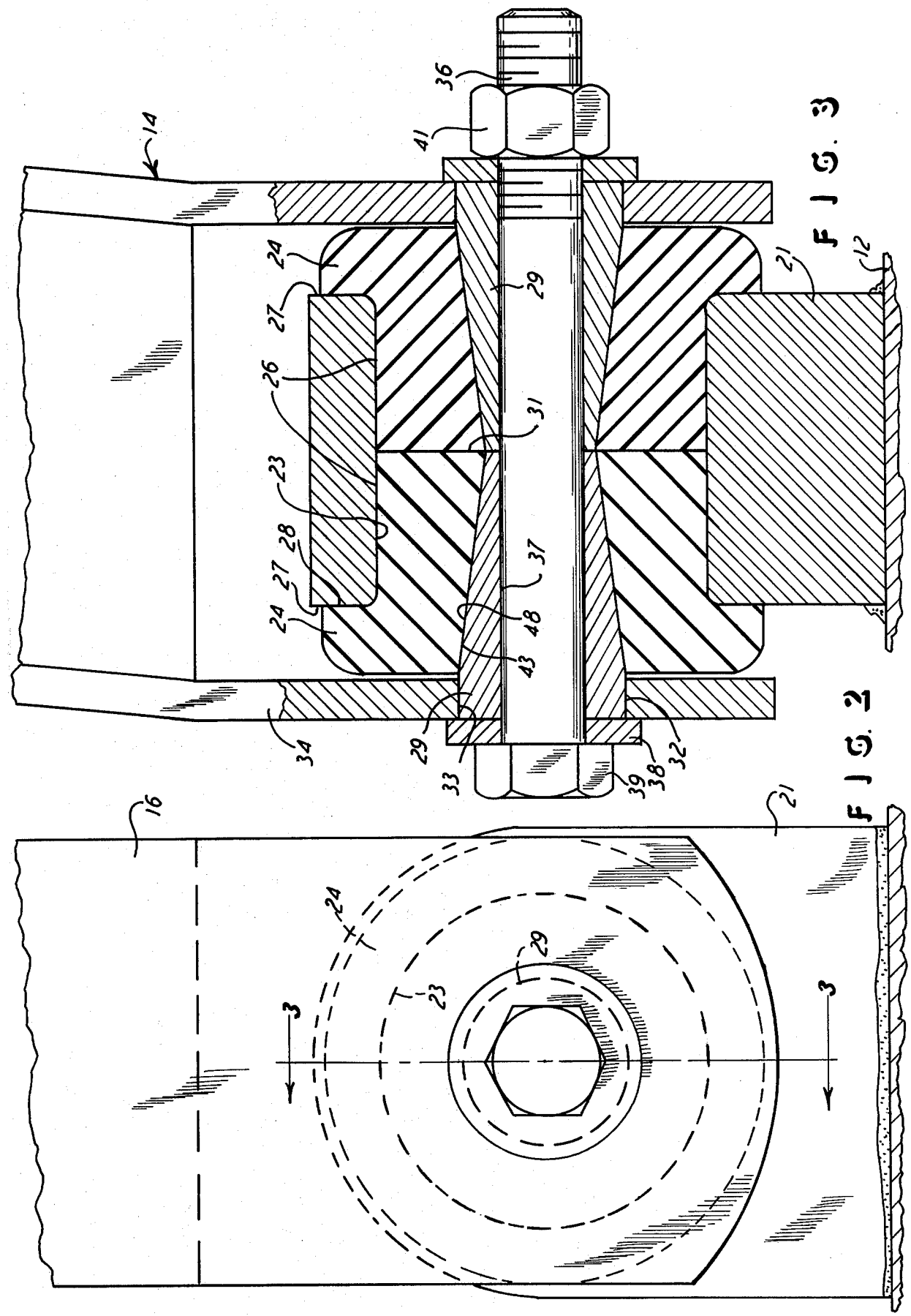

SHOCK MOUNT FOR PROTECTIVE STRUCTURE FOR TRACTORS

This invention relates to a shock mount for protective structure for tractors. That is, it relates to the roll-over protective structure for tractors.

BACKGROUND OF THE INVENTION

The art is aware of the utilization of roll-over protective structures which are mounted on tractors to protect the operator in the event that the tractor rolls over. The structure is in the nature of a canopy extending over the operator's head, and it is available for protecting against any force applied toward the operator while he is seated on the tractor. It is common practice and significant that the protective structures are mounted on the tractor by the interposition of elastomer members which are interposed between the tractor chassis and the protective structure itself. As such, the elastomer members absorb or dampen vibration encountered in normal use of the tractor, and they are also available for absorbing shock when the protective aspect of the structure is being utilized. Of course it will be further understood that tractors are subjected to considerable shock and vibration, and thus the manner in which the protective structure is attached to the tractor is significant and is also important. That is, it must be shock and vibration resistant, it must be sturdy, it must be readily and easily assembled and disassembled, and it must have like and other characteristics.

With further regard to the prior art and the recognized concerns and problems in assembling the protective structures on the tractor, it is recognized and understood that the structure is assembled with a preload in the mount itself, that is, the elastomer member is actually under compression, in order to achieve the desired results, such as those mentioned above. To accomplish this, the prior art has resorted to different methods of achieving the assembly, such as forcing the parts into alignment for the purpose of making the assembly, and such forcing generally requires considerable effort and special attention is required in order to achieve the aligned and forced assembly for the final arrangement of the attachment to the tractor.

Accordingly, it is an object of this invention to provide a protective structure which can be readily and easily attached to a tractor but which has a desired amount of preload or compression in the elastomer member itself so that the desired and adequate assembly of the roll-over structure to the tractor is achieved. One example of a prior art arrangement is found in U.S. Pat. No. 3,851,982, and in that instance, some of the aforementioned problems of the prior art are recognized, and the resilient mount is preloaded in the assembled position. However, in that example, the assembly is arranged so that the mounting bolt itself is subjected to sheer or bending forces, since the forces acting on the bolt are at the center and at opposite ends and are transverse to the axis of the bolt, and the various parts employed in the assembly are arranged so that several of the metal parts are in direct contact or at least adjacent each other in the final assembled position. That is, the present invention provides an assembly wherein the full advantage and characteristic of an elastomer member is utilized in an interposed position between the tractor chassis and the roll-over structure or the post thereof.

Still further, it is an object and advantage of the present invention to provide a roll-over protective structure assembly which can be readily and easily achieved in the assembly of the parts and elements involved, and the tightening bolt, for instance can be easily placed into its position and the entire assembly can then be tightened. Further, it is the tightening feature itself which creates the preload on the elastomer member, and, until the tightening is initiated, the parts are freely aligned and easily assembled and only the tightening of the bolt is required in order to finalize the position of the parts and to create the preload desired. Further, the elastomer portion of the assembly is of sufficient and substantial stock to provide the necessary preload and cushion mount desired, and the elastomer member provides the cushion mounting in all directions radial of the axis of the assembly which is the longitudinal axis of the bolt itself.

Other objects and advantages will become apparent upon reading the following description in light of the accompanying drawings.

BRIEF DESCRIPTION OF THE DRAWINGS

FIG. 2 is an enlarged side elevational view of the shock mount shown in FIG. 1.

FIG. 6 is a side elevational view of one of the two bushings shown in the assembly of this invention, on an enlarged scale.

DETAILED DESCRIPTION OF THE PREFERRED EMBODIMENT

Figure 1:
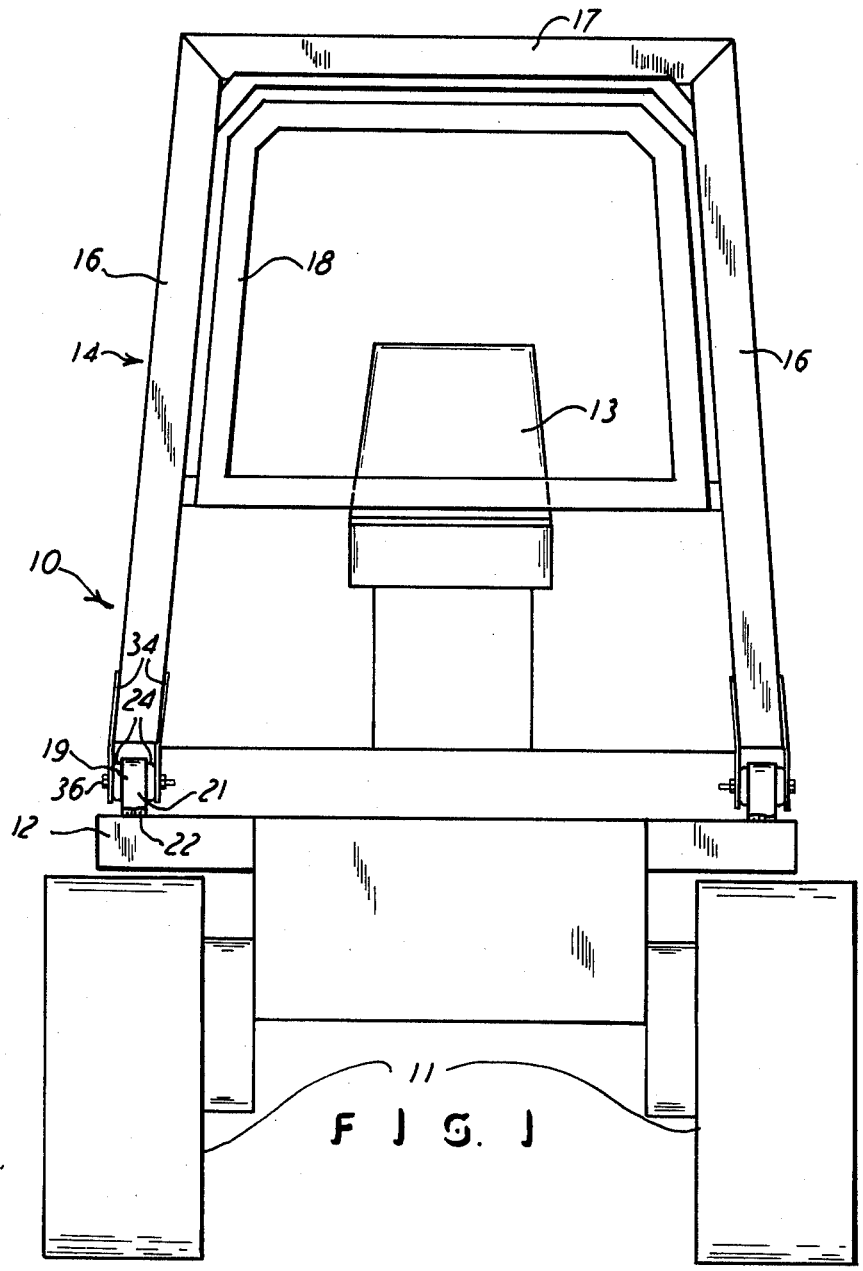
FIG. 1 is a front elevational view of a tractor having a roll-over protective structure and shock mount of this invention.
Figure 3:
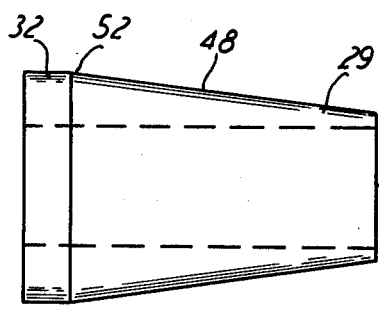
FIG. 3 is a sectional view taken along the line 3—3 of FIG. 2.

FIG. 1 shows a tractor 10 having ground support members 11, and they may be track chains of a caterpillar tractor, and it has a frame or chassis including a member 12 and it has an operator's seat 13 supported on the chassis. FIG. 1 also shows the roll-over protective structure 14, including the upright posts 16 and the overhead bar 17, all which encloses the operator's seat 13 and thus protects the operator while he is in the seated position. A further operator's cage 18 is also shown. The protective structure 14, and particularly the lower ends of its posts 16, are affixed to the tractor 10 by means of the assemblies 19 which are also shown in FIGS. 2 and 3.

The assembly 19 includes a mounting member 21 which is suitably affixed to the tractor frame, such as by welding at 22. The assembly 21 extends upwardly from the frame member 12 and has a circular opening 23 which receives two elastomer inserts 24 in end-to-end relation, such as seen in FIG. 3. In the final assembled position of FIG. 3, the inserts 24 are shown to have outer circumferences 26 in snug contact with the circular opening 23 of the member 21. Also, the member 21 has oppositely faced end walls 27 which are in a tight abutment with circular shoulders 28 on the inserts 24. That is, the outer ends of the inserts 24, relative to their assembled position in FIG. 3, are enlarged and present the circular shoulders 28 which abut the respective walls 27.

The assembly 19 also includes two cylindrical bushings 29 which are in end-to-end relation, and the bushings 29 and the inserts 24 thus have an abutment plane designated 31 where their ends are located. The outer ends of the bushings 29, relative to their assembled position of FIG. 3, have cylindrical portions 32 extending along the axial length of the bushings 29, and those portions 32 are in snug contact with circular openings 33 in each of two legs 34 suitably connected with and extending below the respective posts 16, as seen in FIG. 1. Also, a bolt 36 is included in the assembly and extends through the central end cylindrical openings 37 of the two bushings 29, and washers 38 are at opposite ends of the bolt 36, and the bolt head 39 and a nut 41 are thus available for creating the tension in the bolt 36 and thereby secure the assembly 19 in a manner hereinafter explained.

Figure 4:
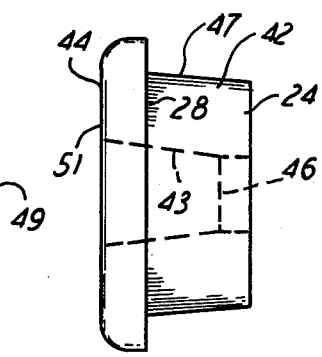
FIG. 4 is a side elevational view.
Figure 5:
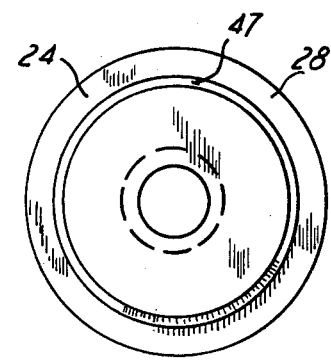
FIG. 5 is an end elevational view of one of the two elastomer inserts shown in the previous drawings.

FIGS. 4 and 5 show the elastomer inserts 24 which are of identical configuration, and thus the inserts have shank portions 42 and they have internal tapered openings 43 which extend from the outer surface 44 and to a reduced diameter at the location designated 46 in FIG. 4. Also, the outer surface of the insert shank portion 42 is tapered, as shown along the surface line designated 47 in FIG. 4. Thus, the inserts 24 have the tapered inner and outer surfaces or configurations, as described and as shown in FIG. 4. Therefore, the inserts are of an elongated sleeve configuration extending along their longitudinal and central axes, and they have the tapered inner opening and the tapered exterior surface, in the free body position such as shown in FIG. 4. However, in the assembled position in final form in FIG. 3, it will be noted that the outer taper 47 is no longer existant, and that is because the bushings 29 have an outer surface taper designated 48, and that surface 48 is in abutting contact with the insert inner taper 43, as seen in FIG. 3. In viewing FIGS. 4 and 6, it will be understood that FIG. 6 is on twice the scale as FIG. 4, however it will also be understood that the bushing end 49 is of a diameter less than the diameter at 51 of the insert 24 for the taper 43, and thus the bushing end 49 freely fits into the large end of taper 43 for the initial assembly of the parts. Further, when the assembly is achieved and the bolt 36 is tightened, the bushing 29 will move inwardly toward the plane 31 and will therefore be wedged into the respective insert openings 43 and thus wedge the inserts 24 outwardly and thereby compress them into firm position with the member 21 as well as with the bushings 29. As such, the inserts 24 are in firm and snug position, and the assembly is easily achieved and the bushings 24 create radial forces both inwardly and outwardly for compressing against the respective bushings 29 and the mounting member 21.

Also, the insert tapers 47 permit easy assembly of the inserts 24 into the mounting member opening 23 for the initial assembly, and it also provides for the configuration for the final compressing of the inserts 24 against the mounting member wall 23 and against the bushings 29, as mentioned. Further, the tapers 43 and 48 are related such that the taper 48 adjacent the portion 32, namely at location designated 52, is larger than the largest diameter of the taper 43, that is at the location designated 51. Therefore, the tapered bushings 29 are positively and firmly pressed against the inserts 24 and extend the inserts radially outwardly when the bushings 29 are moved axially toward each other during the tightening of the bolt 36. Also, the shank of the bolt 36 is snugly disposed within the bolt openings 37 in the bushings 29, and it will also be seen that the total axial length of the two bushings 29 is greater than the total axial length of the inserts 24, and of course the inserts 24 are urged toward each other by virtue of the taper 48, and thus only the inserts 24 are in contact with the mounting member 21 and there is complete radial compression of the inserts 24 against the mounting member circular wall 23.

Accordingly, the inserts 24 include an interior and exterior tapered surface, and the exterior taper provides for a snug fit in the mounting member 21. The interior tapered surface of the inserts 24 and the bushing tapered surface 48 allows for radial clearance in the initial assembly of the parts, and then the tightening of the bolt provides the necessary radial compression for the inserts 24, as desired. Therefore, the desired resilient or elastomer preload is achieved in a sturdy assembly which can be readily and easily accomplished.

What is claimed is:

1. In a shock mount for a protective structure for tractors, a tractor having a chassis, a tractor roll-over protective structure including a post extending upwardly from said chassis and having a pair of spaced lower end members with aligned mounting openings therein, a mounting member affixed with said chassis and interposed between the lower end members of said post and having an opening aligned with said post openings, and an assembly of a pair of elastomer inserts and a pair of bushings and a bolt all disposed in said aligned openings and connected with said post for securing said post to said chassis, the improvement comprising each of said elastomer inserts being of an elongated sleeve configuration having a free-body tapered inner opening of a reduced cross-sectional size from the exterior to the interior of said elastomer insert, each of said bushings being of an elongated sleeve configuration and having a bolt opening therethrough and having an outer periphery snugly disposed in said post mounting opening and being tapered on the exterior surface of said bushing and with the target cross-sectional size of the taper being larger than the largest cross-sectional size of said insert inner opening, said inserts being oppositely disposed in end-to-end axial alignment in said mounting member opening and said bushing being disposed within said insert inner opening and said bolt being snugly disposed in said bushing bolt opening and with said bolt being tightened against the axial end of said bushing and thereby having said bushing taper force radially outwardly on said elastomer insert to force said elastomer insert snugly into said mounting member opening for a snug fit of said assembly with said post and said member.

2. The shock mount for protective structure for tractors as claimed in claim 1, wherein the total axial length of said two bushings is greater than the total axial length of said two elastomer inserts, and with the opposite ends of said bushings extending beyond said elastomer inserts and into snug contact with said post.

3. The shock mount for protective structure for tractors as claimed in claim 2, wherein each said elastomer insert has a free-body tapered exterior surface oriented in the direction of said tapered inner opening, and with the smaller cross-sectional size of said exterior surface being snug with said mounting member opening for compressing each said elastomer insert into said mounting member opening when said bolt is tight.

4. The shock mount for protective structure for tractors as claimed in claim 1, wherein said elastomer insert has a free-body tapered exterior surface oriented in the direction of said tapered inner opening, and with the smaller cross-sectional size of said exterior surface being snug with said mounting member opening for compressing said elastomer insert into said mounting member opening when said bolt is tight.

5. The shock mount for protective structure for tractors as claimed in claim 1, wherein said two bushings have cyclindrically-shaped ends respectively snugly disposed in said post opening.

* * * * *

UNITED STATES PATENT AND TRADEMARK OFFICE
CERTIFICATE OF CORRECTION

PATENT NO. : 4,077,655
DATED : March 7, 1978
INVENTOR(S) : Richard J. Skahill

It is certified that error appears in the above–identified patent and that said Letters Patent are hereby corrected as shown below:

In Claim 1, column 4, at line 40, "target" should read -- largest --

Signed and Sealed this

Twenty-ninth Day of August 1978

[SEAL]

Attest:

RUTH C. MASON
Attesting Officer

DONALD W. BANNER
Commissioner of Patents and Trademarks